Figure 1:
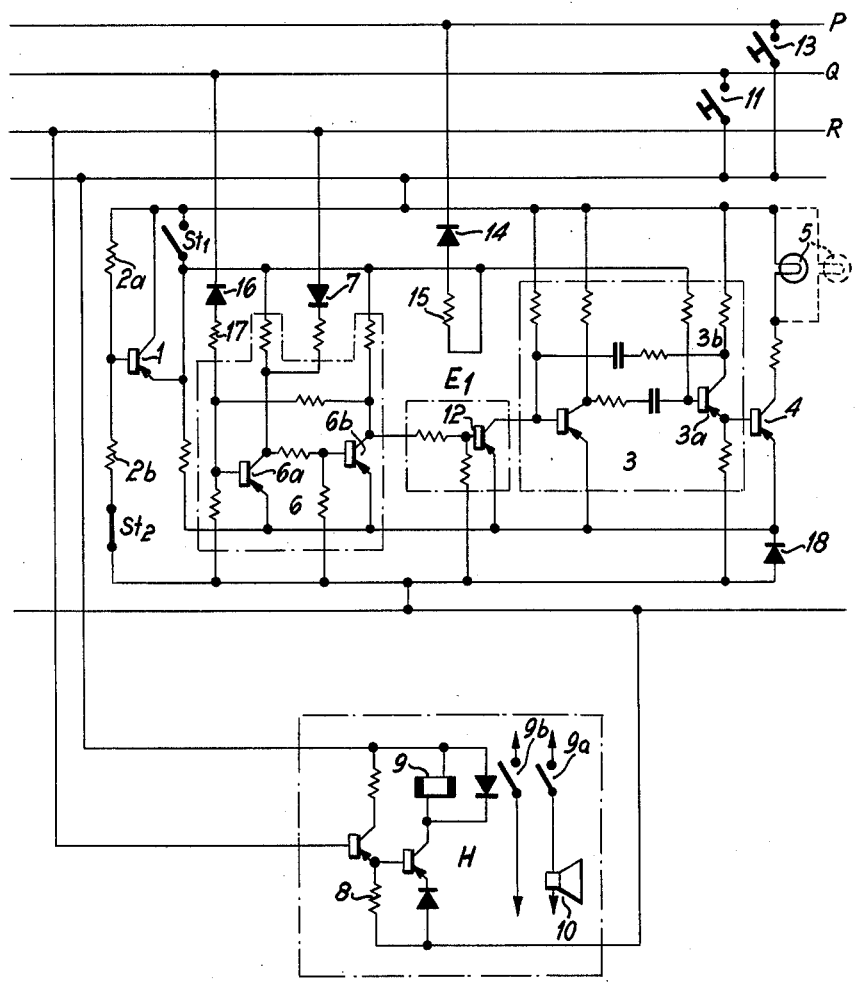

Oct. 12, 1965  H. HÜTTNER  3,212,079
SIGNALLING ARRANGEMENT
Filed March 16, 1962  3 Sheets-Sheet 1

INVENTOR
HANS HUTTNER

By Toulmin & Toulmin
Attorneys

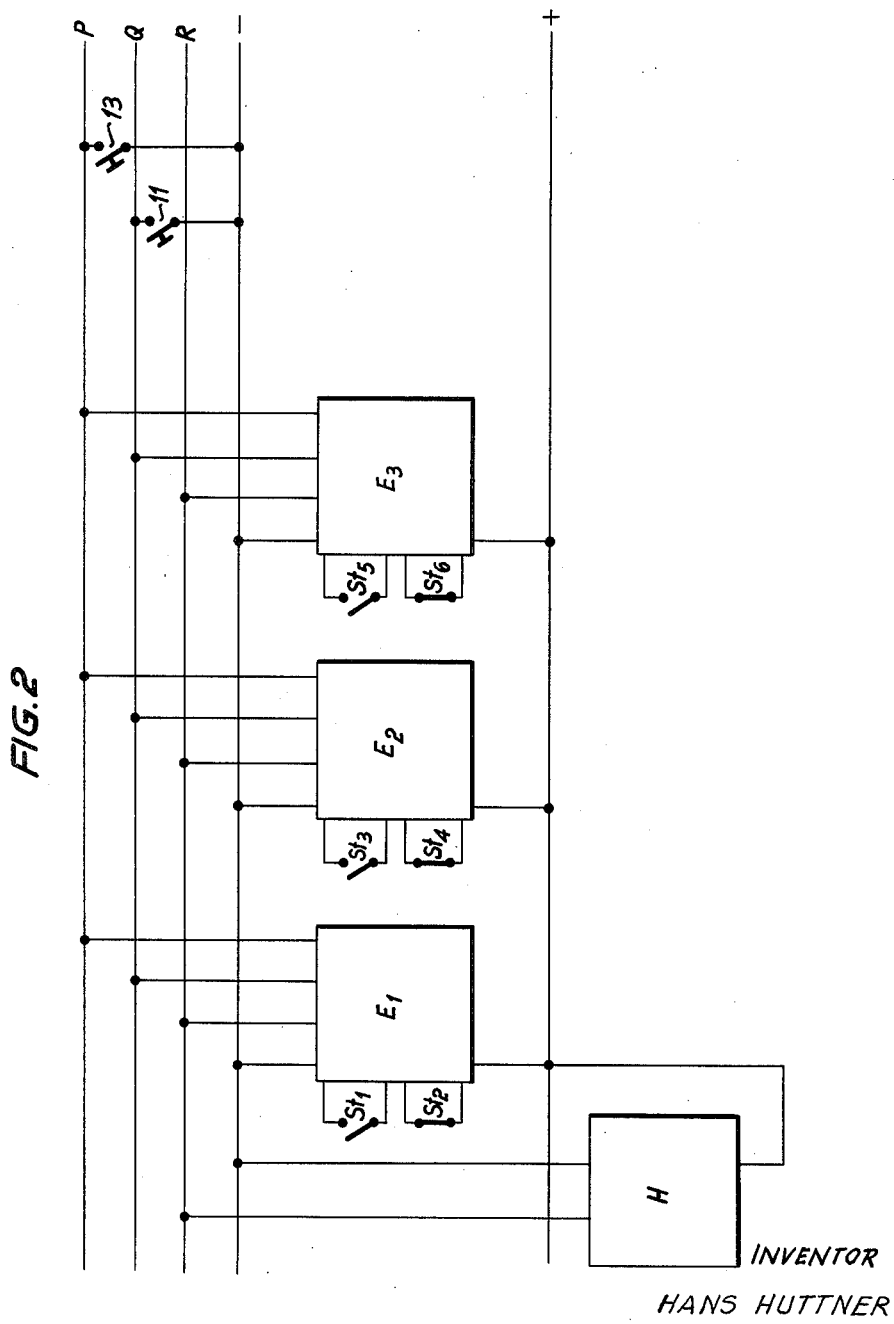

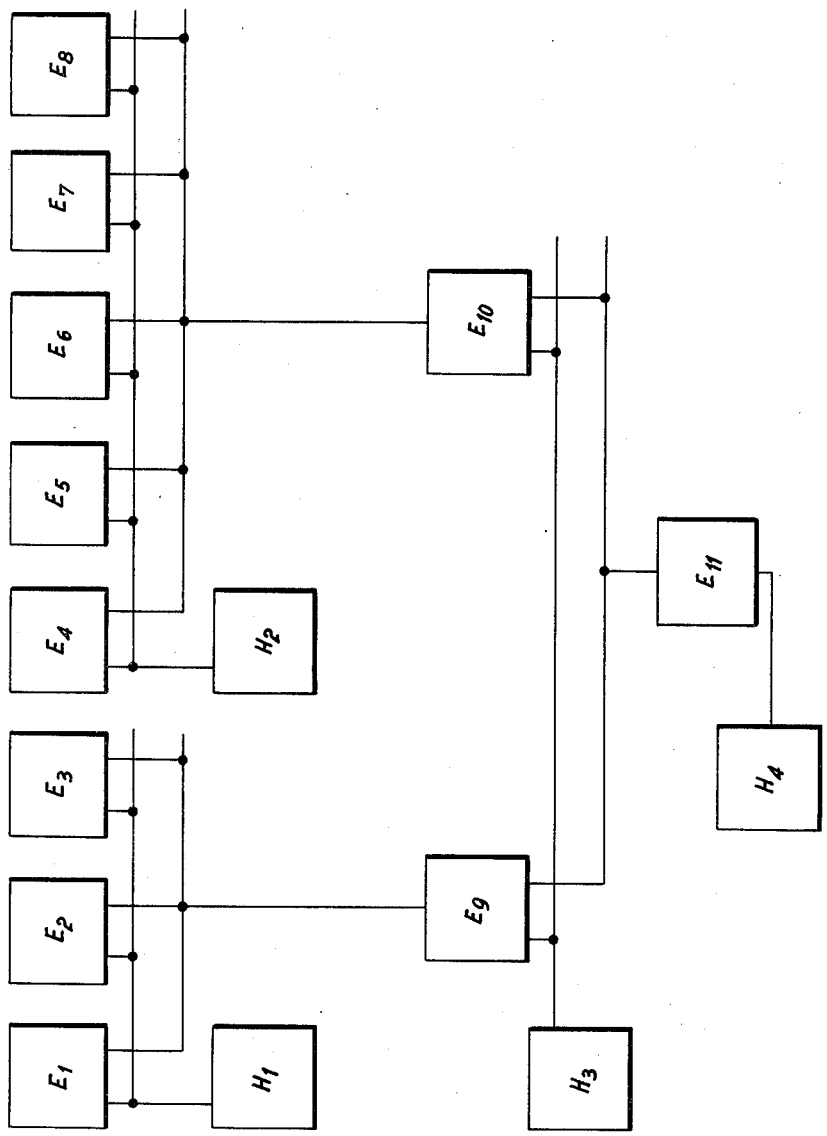

3,212,079
SIGNALLING ARRANGEMENT
Hans Hüttner, Zirndorf, near Nurnberg, Germany, assignor to Eberle & Kohler Kommanditgesellschaft, Nurnberg, Germany
Filed Mar. 16, 1962, Ser. No. 180,295
Claims priority, application Germany, Mar. 18, 1961, E 20,777; Oct. 28, 1961, E 21,876
3 Claims. (Cl. 340—213.1)

The present invention relates to a signalling arrangement for receiving signals over signal circuits in response to the existence of predetermined conditions, more particularly, to a signal unit having both visual and audio signal indicators wherein the visual signal indicator continues to be actuated until the signalled condition has been corrected or eliminated.

Many forms of signal arrangements have been devised in order to indicate to an operator the existence of abnormal conditions in areas located remotely from the operator. These signal circuits essentially comprise some form of indicator means which is actuated in response to the existence of such abnormal conditions. Such signal circuits generally comprise mechanical multi-step switches, various form of relays or flip-flop circuits.

Similarly known is a signal circuit comprising a flip-flop circuit which is triggered by means of a control contact actuated in response to a predetermined condition. The output of this flip-flop circuit is then directed to a further flip-flop circuit which is thereby energized and thus gives an alarm or indication of the presence of such a condition.

These signalling arrangements, such as described above, have certain basic disadvantages. These signal circuits which comprise relays having open contacts or multi-contact switches cannot be used with any degree of reliability in chemical plants since the contacts are susceptible to corrosion and hence the signalling circuit will malfunction. Accordingly, elaborate measures must be taken to enclose such relays in protective casings in order to protect the contacts from the effects of a corrosive atmosphere.

Such signalling circuits having flip-flop circuits have the disadvantage that the flip-flop circuit cannot differentiate between a signal indicating the presence of an abnormal condition and the signal given in response or acknowledgement to the condition signal. In those circumstances, where oscillating signal indicators are desired, it is necessary to provide a special oscillator device therefor.

In those signalling arrangements where signals are stored and then discharged into a control circuit, there is the disadvantage that no clear signals will be obtained from the control circuit in the event there is any malfunctioning in the signalling arrangement itself or in a single signalling unit.

It is, therefore, the principal object of the present invention to provide a novel and improved signalling arrangement which provides for the dependable emission of alarm signals.

It is a further object of the present invention to provide a signalling arrangement operating by relay techniques but not having any opening contacts which may be susceptible to corrosion.

It is an additional object of the present invention to provide a signalling arrangement wherein the several elements of a signal unit are connected to each other and to signal circuits electrically but not mechanically.

The signalling arrangement of the present invention comprises a plurality of signal units each of which is responsive to a predetermined condition. Each signal unit has connected thereto a distinctive visual signal indicator so that the actuation of the visual indicator will indicate to the operator which condition is abnormal. The visual signal remains actuated until the condition is corrected.

In addition, an audio signal indicator is connected so that energization of any of the signal units will actuate the audio indicator. Thus, the existence of any condition will simultaneously actuate a distinctive visual signal indicator and the audio signal indicator. The audio signal can be shut off immediately but the visual signal remains until the condition is corrected.

Each signal unit consists of flip-flop circuits or control rectifiers and multivibrators each of which is so connected that a signal condition is clearly indicated. Further, the different elements of the signal unit are connected to each other and to the signal circuits by galvanic means such as transistors or diodes whereby the disadvantages of contacts such as described above are eliminated.

A testing circuit is provided whereby all of the signal units can be connected to test whether all of the units are functioning properly. Because of the galvanic connections, if an abnormal condition arises during this testing, the signal will still be received by the signal unit and the visual and audio signal indicators will be actuated.

The individual signal units are so connected with the amplifier for the audio signal indicator that the effects of mutual influence are eliminated.

Other objects and advantages of the invention will be apparent with reference to the accompanying description when taken in conjunction with the following drawings, wherein FIGURE 1 is an electrical circuit diagram showing schematically the signal unit of the present invention;

FIGURE 2 is an electrical circuit diagram showing schematically the connection of a plurality of signal units and a single audio signal indicator to the signal circuits; and FIGURE 3 shows schematically the manner in which a plurality of signal units and audio signal indicators may be connected in groups.

Returning now to the drawings, more particularly to FIGURE 1, wherein like reference symbols indicate the same parts throughout the various views, a signal unit of the present invention is shown at $E_1$. The signal unit $E_1$ is connected between electric lines connected to the positive and negative sides of a direct current source. The signal unit is also connected to several circuits including a test circuit P, an acknowledging or responsive circuit Q and a circuit R for the audio signal indicator shown at H. The signal unit includes a transistor 1 through which it is possible to selectively employ a normally open or normally closed contact for actuating the signal unit. Voltage is supplied to the transistor 1 through either of the resistors $2a$ and $2b$.

The signal unit $E_1$ also comprises a multivibrator circuit 3 including a transistor $3a$ and a resistor $3b$. A transistor 4 is connected to the output of the multivibrator circuit 3 to amplify the output thereof which is transmitted to a visual signal indicator comprising a lamp 5.

Also included in the signal unit is a flip-flop circuit 6 having transistors $6a$ and $6b$. The flip-flop circuit 6 is connected to the audio signal indicator H through a diode 7.

The audio signal indicator H comprises a transistor 8 for amplifying the signal received and a relay coil 9 which actuates relay switches $9a$ and $9b$. The relay switch $9a$ is connected to a buzzer 10 or some other suitable audio alarm.

The flip-flop circuit 6 is connected to the response circuit Q through a switch 11 and a diode 16 and resistor 17.

A transistor 12 connects the flip-flop circuit 6 with the multivibrator circuit 3.

A test key 13 is provided to apply a voltage to the base of the transistor 3a through diode 14 and a resistor 15.

The normally open control switch $St_1$ and normally closed contact switch $St_2$ are connected through signal circuits so as to be responsive to a predetermined condition. When such a condition arises, either the switch $St_1$ will be closed or the switch $St_2$ will be opened. The actuation of either of these switches will close a circuit to supply a voltage to the base of the transistor 3a and accordingly the multivibrator 3 will begin to oscillate. The oscillations are amplified by the transistor 4 and sent to the indicator lamp 5 which will blink on and off in synchronism with the oscillations of the multivibrator 3. This provides a visual alarm that a certain abnormal condition exists.

Simultaneously with the energization of the multivibrator 3 the flip-flop circuit 6 is also energized by delivering a voltage to the base of the transistor 6a which becomes conducting. The output of the transistor 6a is then sent through the diode 7 to the amplifying transistor 8 wherein the relay coil 9 is energized and an audio alarm is sounded.

The further contact 9b can be used to transmit further signals or to execute additional switching instructions.

Upon hearing the audio signal and seeing the visual signal, the operator acknowledges receipt of these signals by flipping the response switch 11 whereby the flip-flop circuit 6 is triggered through the diode 16 and the resistor 17. As a result, the transistor 6b is now conducting and a voltage is no longer transmitted to the audio alarm through the amplifier 8. As a result, the relay coil 9 is deenergized and the audio alarm stopped.

With the conducting of the transistor 6b the coupling transistor 12 becomes conducting and short-circuits the multivibrator circuit 3 in such a way that only the transistor 3a remains conducting. Accordingly, the signal lamp 5 will remain energized but will no longer oscillate so that a continuous beam of light is emitted. The signal lamp 5 will continue to glow until the abnormal condition has been corrected.

Upon correction or restoration of the abnormal condition, either the control contact $St_1$ will reopen or the control contact $St_2$ will close. The signal unit $E_1$ will then return to its initial position.

In order to periodically test the connected signal units the test switch 13 is closed so that a voltage is applied through diode 14 and resistor 15 to the base of transistor 3a of the multivibrator 3 and the flip-flop circuit 6. Thus, the entire signal unit will operate as if an abnormal condition existed. The response or acknowledgement of the operation of the signal unit is again made by closing the response key 11.

Upon opening the test key 13, the signal unit can again receive alarm signals. Since the elements of the signal unit are connected galvanically through the diodes to the signal circuits, it is pointed out that the signal unit can still receive signals indicating abnormal conditions even when the test switch 13 is closed. Thus, the signal units are still in operation even when they are being tested and as a result the danger is eliminated that abnormal conditions would arise during testing of the signal circuits and these abnormal conditions would not be indicated.

The resistor 3b of the multivibrator circuit 3 could be replaced by the signal lamp 5. This would eliminate the need for the amplifying transistor 4.

The flip-flop circuit 6 is essentially a bistable multivibrator and as such can be triggered by the application of a negative pulse to the base of the off-transistor, or a positive pulse to the base of the on-transistor. In the circuit illustrated in FIGURE 1, this means a negative voltage can be applied to the transistor 6a or a positive voltage to transistor 6b.

Proceeding next to FIGURE 2, there is illustrated a modification of the present invention wherein a plurality of signal units $E_1$, $E_2$ and $E_3$ is interconnected. Each signal unit is responsive to a predetermined condition such as temperatures of various substances when the signal unit is used with respect to a chemical process, pressures, or other indicia of normal operation. Each signal unit is provided with its own control contacts which are responsive to a particular condition. However, only a single audio signal indicator H is provided but is connected to all of the signal units. Thus, actuation of either of the signal units $E_1$ to $E_3$ will actuate the audio alarm H. In addition, actuation of the response switch 11 or the test switch 13 will actuate all of the signal units $E_1$, $E_2$ and $E_3$ together with the alarm H, so that all of the units may be tested for proper operation.

FIGURE 3 illustrates a further modification wherein the signal units are interconnected in groups. In this modification, signal units $E_1$ through $E_3$ are connected into one group and signal units $E_4$ through $E_8$ are connected into another group. Each group is in turn connected to signal units $E_9$ and $E_{10}$, respectively, and all of the signal units $E_1$ through $E_{10}$ are connected to a signal unit $E_{11}$.

Audio alarms are provided for each group. Accordingly, alarm $H_1$ is provided for signal units $E_1$ through $E_3$ and audio alarm $H_2$ for signal units $E_4$ through $E_8$. In addition, audio alarm $H_3$ is provided for signal units $E_9$ and $E_{10}$ and audio alarm $H_4$ for signal unit $E_{11}$.

The group arrangement of FIGURE 3 might be employed in a chemical plant whereby each signal unit is responsive to fire or other dangerous conditions such as a dangerous concentration of certain chemicals in the atmosphere. Thus, when the alarm $H_4$ and the signal unit $E_{11}$ are actuated, the operator can instantly locate the presence of the dangerous condition by observing which of the signal units $E_9$ and $E_{10}$ is actuated, and then by observing each of the signal units in the respective group. This arrangement thus will enable a single operator to keep close observation on the existing conditions in a plurality of scattered places of a chemical plant.

With the use of galvanic means to connect the various elements of the signal circuits, such as diodes and transistors, the danger of malfunctioning of the signal circuit by corrosion of contacts is eliminated. Further, by employing such galvanic connections the signal circuits can operate at low voltages such as twelve volts. Since each signal unit has a distinctive rate of oscillation for its visual alarm, the operator can instantly determine which condition is abnormal merely by the frequency at which the warning lamp is energized. Since the warning lamp will remain energized until the condition is corrected, the operator is instantly appraised of the state of the indicated abnormal condition.

One or more flip-flop circuits may additionally be connected to each signal unit in order to store the signals indicating the existence of an abnormal condition. Since these signals are transmitted only temporarily until the condition has been corrected, it may be desirable that these alarm signals be stored for a certain period of time or until a predetermined response signal is given to these alarm signals. In this manner the operator can quickly ascertain the origination of the alarm signals even if the alarm signal is given only for a short period of time such as several seconds. This may occur when a condition reaches an abnormal point for only a few seconds of time but it is desired to ascertain where this condition originated in order that long range corrective measures might be taken. Thus, even though the alarm signals cease to be transmitted after the condition returns to normal, the provision of these flip-flop circuits will enable the alarm signals to be stored for future reference.

Thus, it can be seen that the present invention provides a signalling arrangement which both visually and audibly indicates the presence of abnormal conditions. Further, the galvanic connections between the several elements of the signal units and between the signal units and the signal circuits ensure long operating life of this signal arrangement even in highly corrosive atmospheres such as may be found in various chemical plants.

In order to obtain reliable operation of the transistors used in the signal units over a wide range of temperatures it is necessary that the bias voltage and current remain stable. However, where variations of reverse bias collector current and emitter-base junction resistance with temperature precludes stable bias values, external compensating circuits are employed. While these stabilizing circuits may employ a variety of elements such as resistors, thermistors, junction diodes, transistors and break-down diodes, a temperature-stabilizing circuit including diodes may be used in the present signal unit. The main advantage of using a junction diode as a temperature-sensitive element is that it can be made of the same material as that of the transistor. The temperature coefficient of resistance of the diode and that of the transistor of the same material are the same. This condition permits a more constant collector current with a wide range of temperatures. The circuit may comprise one or several diodes in the low resistance direction or a Zener diode in the high resistance direction.

In FIGURE 1 of the drawings, the diode 18 functions as a temperature-stabilizing element.

The flip-flop circuit and its transistors can be replaced by multi-layer diodes or controllable rectifiers such as mercury arc rectifiers or ignitrons. The operation of a multi-layer diode such as a four-layer diode can be considered the equivalent of two junction transistors.

It will be understood that this invention is susceptible to modification in order to adapt it to different usages and conditions and, accordingly, it is desired to comprehend such modifications within this invention as may fall within the scope of the appended claims.

What is claimed as this invention is:

1. A signalling unit for a signalling system comprising a flip-flop circuit having a first and a second output state; a multivibrator circuit, a visual signal connected to the output of said multivibrator circuit; condition responsive means operable to shift said flip-flop circuit from said first to said second state and, at the same time, operate said multivibrator circuit into an oscillating state; acknowledgement means operable to shift said flip-flop circuit from said second to said first state; and galvanic means including a switching transistor connecting said flip-flop circuit to said multivibrator circuit, said transistor connecting said flip-flop and multivibrator circuits so that said flip-flop circuit can switch said multivibrator circuit between its oscillating and steady operations.

2. The invention as defined in claim 1, additionally including a relay, a second transistor and an audio alarm; said flip-flop circuit upon changing from said first state to said second state producing a signal which is amplified by said second transistor to energize said relay to sound said audio alarm.

3. The invention as defined in claim 2, said acknowledgment means operable to shift said flip-flop circuit from said second to said first state and thereby removing said last-named signal and thereby cutting off said audio alarm.

References Cited by the Examiner
UNITED STATES PATENTS

| 3,029,421 | 4/62 | Beguin | 340—213 |
| 3,076,185 | 1/63 | Ida | 340—213 |
| 3,136,982 | 6/64 | Sargent | 340—213.1 |

FOREIGN PATENTS 1,091,910  1/58  Germany.
(Corresponding U.S. 3,128,456, 4/64)

OTHER REFERENCES

Universal Panalarm "50", publication by Panalarm Products, Inc., Chicago, Ill., copyright 1952, received July 26, 1956, pp. 11, 12, 15 and 16.

Brown et al., "Transistors: A New Class of Relays," in Control Engineering, December 1956, pp. 70–76.

NEIL C. READ, *Primary Examiner.*